US006194851B1

United States Patent
Denault et al.

(12) United States Patent
(10) Patent No.: US 6,194,851 B1
(45) Date of Patent: Feb. 27, 2001

(54) BARRIER OPERATOR SYSTEM (75) Inventors: Brian G. Denault, Seattle, WA (US); Gerald N. O'Berto, Colorado Springs, CO (US); Scott A. Crowner, Lynnwood, WA (US)

(73) Assignee: Hy-Security Gate, Inc., Seattle, WA (US)

( * ) Notice: Subject to any disclaimer, the term of this patent is extended or adjusted under 35 U.S.C. 154(b) by 0 days.

(21) Appl. No.: 09/238,697

(22) Filed: Jan. 27, 1999

(51) Int. Cl.[7] ................................. H02P 1/00; G05D 3/00
(52) U.S. Cl. .......................... 318/139; 318/808; 318/466
(58) Field of Search ........................... 318/254, 807–812, 318/466–473, 139; 49/349

(56) References Cited

U.S. PATENT DOCUMENTS

| | | | | |
|---|---|---|---|---|
| 4,318,169 | * | 3/1982 | Kucharczyk ........................ | 318/266 |
| 4,364,003 | * | 12/1982 | Phipps ................................ | 318/467 |
| 4,401,929 | * | 8/1983 | Odaka et al. ....................... | 318/466 |
| 4,403,449 | | 9/1983 | Richmond ........................... | 49/340 |
| 4,429,264 | | 1/1984 | Richmond ........................... | 318/466 |
| 4,501,343 | * | 2/1985 | Salihi ................................. | 187/296 |
| 4,563,625 | | 1/1986 | Kornbrekke et al. ............... | 318/603 |
| 4,851,746 | * | 7/1989 | Milke ................................. | 318/467 |
| 4,994,724 | * | 2/1991 | Hsu .................................... | 318/603 |
| 5,057,760 | * | 10/1991 | Dadpey et al. ..................... | 318/807 |
| 5,063,337 | * | 11/1991 | Evin ................................... | 318/617 |
| 5,276,391 | * | 1/1994 | Jonsson .............................. | 318/480 |
| 5,640,806 | | 6/1997 | Hall .................................... | 49/360 |
| 5,729,101 | | 3/1998 | Richmond et al. ................. | 318/282 |
| 5,780,987 | | 7/1998 | Fitzgibbon et al. ................ | 318/466 |
| 5,896,021 | * | 4/1999 | Kumar ................................ | 318/775 |
| 5,950,752 | * | 9/1999 | Lyons ................................. | 180/65.2 |
| 5,956,249 | * | 9/1999 | Beran et al. ........................ | 318/261 |
| 5,963,000 | * | 10/1999 | Tsutsumi et al. . | |
| 5,982,126 | * | 11/1999 | Hellinga et al. ................... | 318/468 |
| 6,092,338 | * | 7/2000 | Crowner et al. ................... | 49/360 |

* cited by examiner

Primary Examiner—Brian Sircus
(74) Attorney, Agent, or Firm—Seed Ip Law Group Pllc (57) ABSTRACT

A barrier operator moves a movable barrier using a motive source having a movable member, a station, and first and second flexible members. The station includes a drive system operatively coupled to the movable member of the motive source. The drive system includes input and output members. The first and second flexible members each have first and second ends and a portion extending from the station. The first ends of each flexible members are operatively coupled to the movable barrier and the second ends of each of the flexible members are operatively coupled to the output drive system member of the station. Aspects include the first and second flexible members being cable or wire. Other aspects include the output drive system member of the station being a spool. The drive system further includes a gear box operatively coupled to the spool. Other aspects include the movable barrier being a gate or door. Further aspects include the motive member being a 3-phase alternate current electric motor having a motor shaft as the movable member. The electric motor is supplied with 3-phase electrical power having voltage levels less than 65 volts root mean square. Additional aspects include calibration of fully opened and closed positions of the movable barrier, automatically positioning of the movable barrier by the barrier operator, supplying 0 hertz electrical power to the electric motor for heating based upon a temperature threshold, and control of frequency of the electrical power supplied to the motor based according to a continuous function of barrier position.

35 Claims, 7 Drawing Sheets

BARRIER OPERATOR SYSTEM

TECHNICAL FIELD

The present invention relates generally to barrier systems, and more particularly, to barrier operators. The present invention is related to commonly assigned, concurrently filed and co-pending U.S. application Ser. No. 09/238,696, now U.S. Pat. No. 6,092,338 for "Barrier Operator System."

BACKGROUND OF THE INVENTION

Barriers of all types are used throughout the world to prevent intrusion into restricted areas or retain personnel or goods within restricted areas. Intruders include unwanted personnel, animals, vehicles, and the weather. At times personnel and goods must enter or leave restricted areas, resulting in the requirement for at least part of the barrier to be movable. Movable barriers, such as gates, doors, and movable portions of walls, allow passage out of and into restricted areas. Humans have been used to move movable barriers. In many areas of the world they still do. However, barrier operators have been developed to replace the need for humans to supply the motive force needed to move movable barriers.

Barrier operators are abundant and diverse in design, and available from many manufacturers. These barrier operators typically utilize common elements. One common element is a chain or rail that mechanically interfaces with a motive source that supplies the motive force to move the movable barriers. Due to the inherent nature of these chain and rail systems, requirements for the motive source are demanding. The chain and rail systems are heavy and maintenance intensive, generate great frictional drag, are vulnerable to weather conditions, require special installation skills, and demand extra reinforcement of barriers to handle stresses inherent with the systems.

The motive sources typically used with barrier operators generally are electrical motors. These motors typically are either DC, or high voltage single phase or three phase AC. Unfortunately, these motors have associated issues that adversely affect barrier operators. For instance, the DC motors tend to be short lived and have high maintenance requirements. The single phased and three phase high voltage AC motors require local connections to high voltage, electrical power sources having voltage ratings such as 115, 230, or 460 volts with associated danger introduced to the region of the barrier operators. Also, control by prior art barrier operators of barriers is limited resulting in poor performance in positioning the barrier, and accelerating or decelerating the barrier.

Prior art barrier operators have also performed poorly under emergency conditions. For instance, deaths have resulted due to emergency medical personnel being unable to move barriers because the medical personnel did not have access codes or the primary source of power for a barrier operator failed.

Providing power to barrier operators has created logistical problems as well. The expense of running a power line to the barrier operator or using elaborate remote based power systems are common problems. Another common problem arises from the harsh environments inflicted on some barrier operators. These environments include extreme cold requiring added equipment to maintain an environment suitable for operation.

Attempts have been made to remedy some problems with barrier operators. However, these attempts have been impractical or have been limited to specialized applications. A solution to the multifaceted problems involved with barrier operators which can be applied to broad classes of barriers has been absent from prior art barrier operators. The present invention fulfills these needs and further provides other related advantages.

SUMMARY OF THE INVENTION

The present invention resides in a barrier operator to move a movable barrier along a path. The barrier operator includes a three phase alternating current electric motor having a motor shaft. Additional aspects of the invention include an electrical inverter with an inverter input and an inverter output. The inverter input is electrically coupled to a direct current electrical power source and the inverter output is electrically coupled to the three phase alternating current electric motor. The inverter is configured to supply three phase electrical power to the electric motor with a voltage difference less than or equal to 65 volts root mean square between any two of the three phases.

Further aspects include a station including a drive system with at least one drive system member operably coupled to the movable barrier. A controller is electrically coupled to the inverter. The controller is configured to adjust frequency through a continuous range of the electrical power supplied by the inverter to the three phase alternating current electric motor based upon positions of the movable barrier along the path. The controller is further coupled to a position sensor to record sensor readings associated with a fully-open position and a fully-closed position of the movable barrier to be used in determining a position of the movable barrier.

Further aspects include the controller determining when the movable barrier has moved along the path without assistance from the three phase alternating current electric motor. This determination is based upon a change in position of the movable barrier along the path as indicated by the position sensor and by a frequency of the electrical power supplied to the three phase alternating current electric motor by the inverter during the change in position of the movable barrier along the path. Additional aspects include the controller controlling the inverter to supply a repositioning electrical power to the three phase alternating current motor to maintain the movable barrier at a selected position along the path to which the movable barrier was moved by the three phase alternating current electric motor. The repositioning electrical power being selected by the controller sufficient to reposition the movable barrier back to the selected position when the movable barrier is moved therefrom other than by the three phase alternating current electric motor.

DETAILED DESCRIPTION OF THE INVENTION

Figure 1:
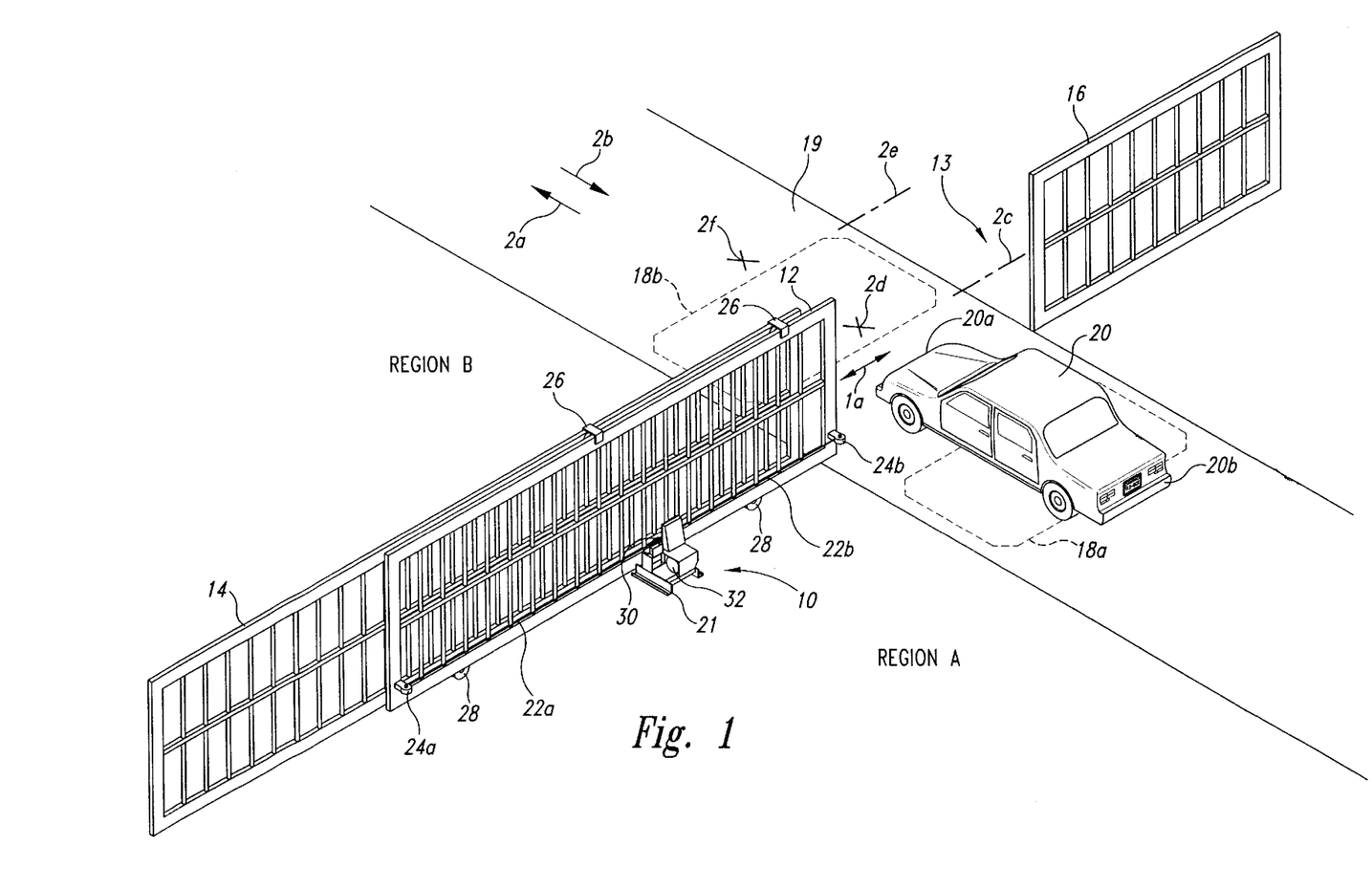
FIG. 1 is a perspective view showing a barrier operator in accordance with the present invention attached to a movable barrier in a typical operating environment.
Figure 2:
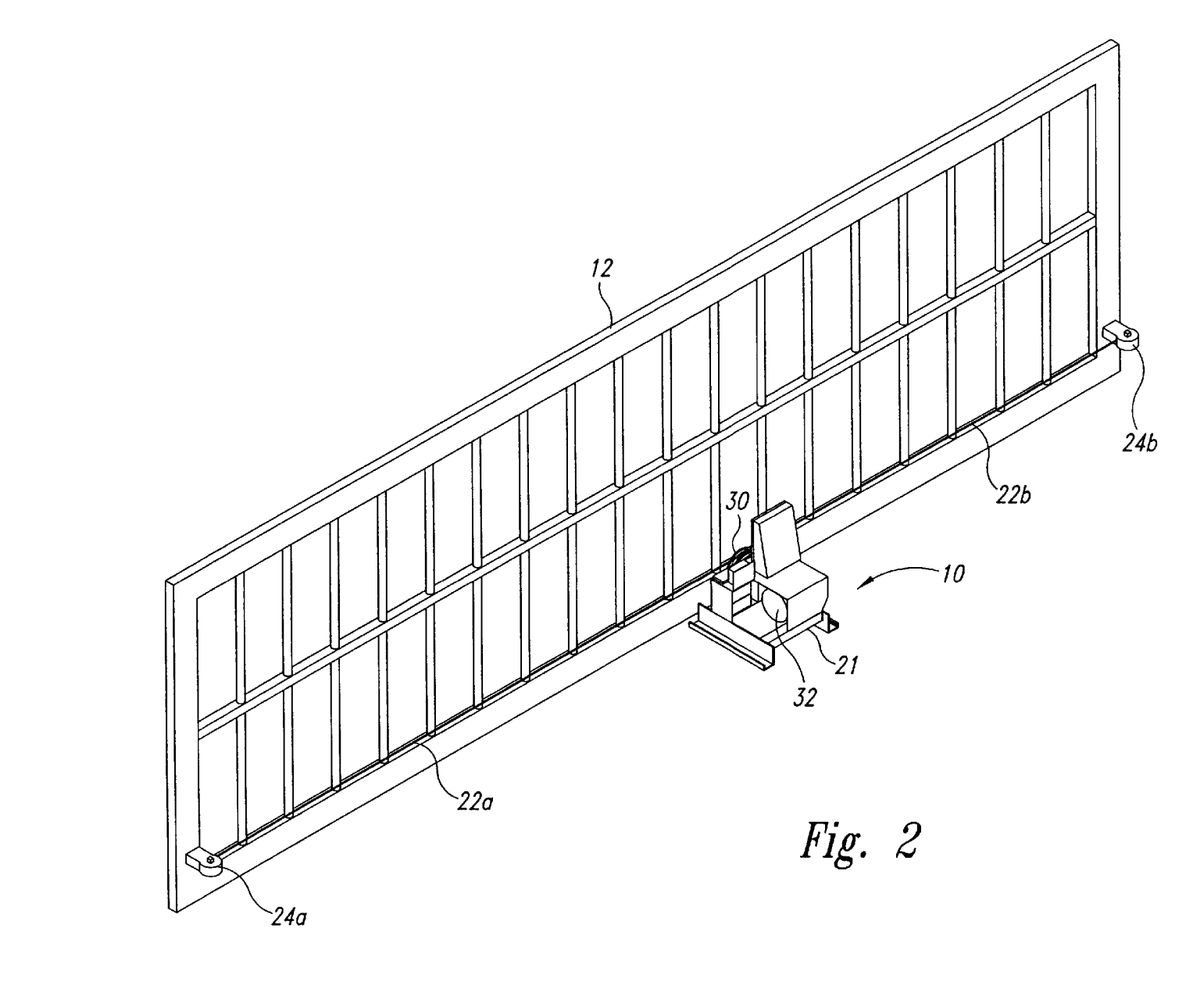
FIG. 2 is an enlarged perspective view of the barrier operator of FIG. 1 attached to a movable barrier.

As shown in the drawings for purposes of illustration, the present invention is embodied in a barrier operator indicated generally by reference 10. In a depicted embodiment, the barrier operator 10 moves and controls a movable barrier 12 which moves back and forth along a path indicated by direction arrow 1a of FIG. 1. The movable barrier 12 when in a fully closed position fully blocks an opening 13 between fixed barriers 14 and 16. In the fully closed position, the movable barrier 12 fully blocks the opening 13 and thus restricts passage. In a fully open position, the movable barrier 12 does not block the opening 13. The movable barrier 12 is shown in FIGS. 1 and 2 between the fully open and fully closed positions. In the depicted embodiment, the movable barrier 12 serves as a gate which controls passage based on inputs from devices such as induction loops 18a and 18b between a first region A and a second region B demarcated by the fixed barriers 14 and 16, the opening 13, and the movable barrier 12 along road surface 19 by vehicle 20 and other objects of movement such as pedestrians, animals, and other type vehicles as shown in FIG. 1.

The barrier operator 10 includes a station 21, and first and second cables 22a and 22b, respectively, in the depicted embodiment of FIGS. 1 and 2. The station 21 provides motive force to the first and second cables 22a and 22b as described below. The first and second cables 22a and 22b are each attached at one end to opposite ends of the movable barrier 12 at cable tensioners 24a and 24b, respectively, in the depicted embodiment. The movable barrier 12 is supported by the fixed barrier 14 through rollers 26, as illustrated in FIG. 1. The rollers 26 are attached at fixed locations to the fixed barrier 14 and rollably support the movable barrier 12, allowing the movable barrier to move along the directions indicated by the direction arrow 1a. The movable barrier 12 is supported from below by wheels 28 attached at fixed locations to the movable barrier for rolling along the ground or a track (not shown).

In other embodiments, the barrier operator 10 moves and controls other movable barriers besides the movable barrier 12 of the depicted embodiment. These other movable barriers of other embodiments include doors such as swinging, sliding, raising, lowering, rolling, or the like that close openings for entrance and/or egress by persons, vehicles, or other objects into or out of buildings, other structures, restricted areas, or pedestrian or vehicular traffic ways. Examples include vehicular traffic at entrances or exits to residential, commercial, or industrial buildings or areas such as garages, loading docks, parking lots, gated communities, or other secured areas. Further, movable barriers include other types of gates including, but not limited to, swinging, sliding, raising, lowering, rolling, or the like that are stand-alone passage barriers or are portions of walls, barriers, or fence systems that control entrance and/or egress by persons, vehicles, or other objects, typically to complete or selectively close and open the perimeters of defined areas. Another class of movable barriers included in further embodiments include, but are not limited to, louvers, shutters, cantilever devices, vertical pivot gates, horizontal slide-gates, swing-gates, lift-gates, draperies, blinds, shades, and windows including skylights.

Figure 3:
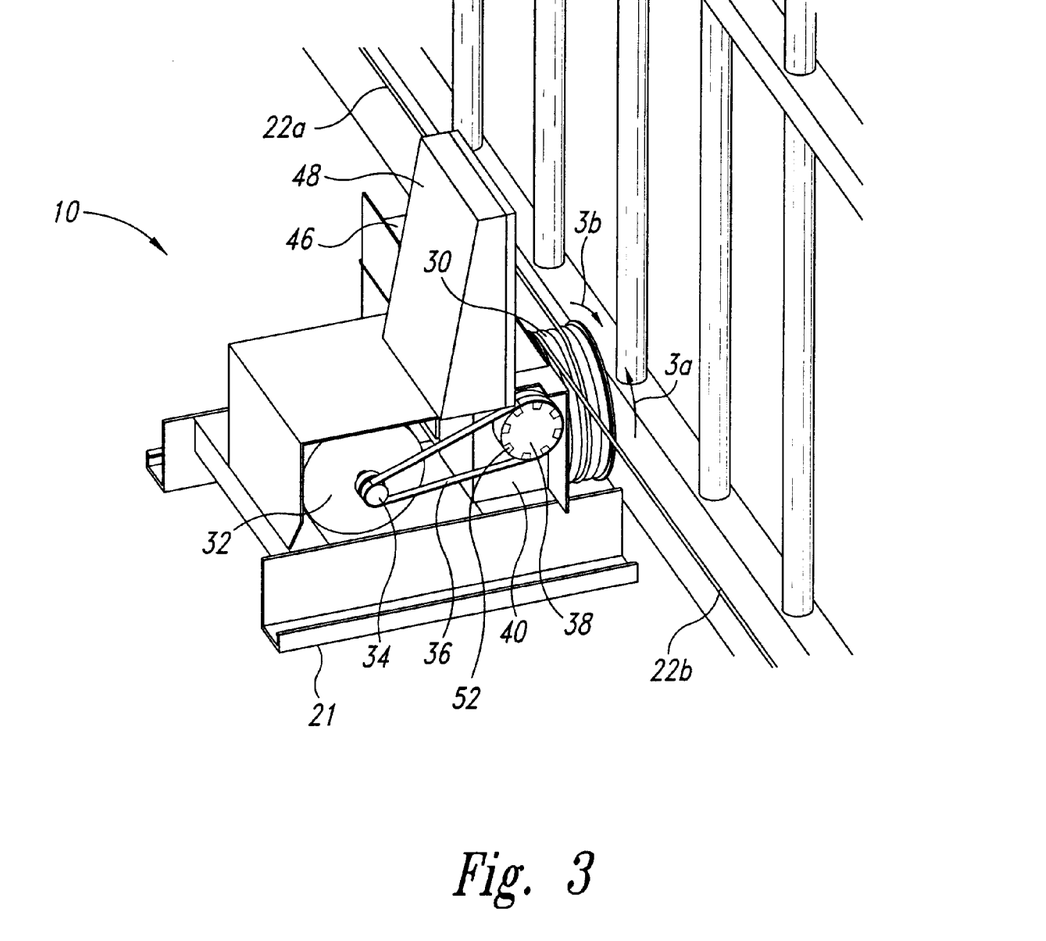
FIG. 3 is an enlarged, perspective view of the barrier operator of FIG. 2 attached to a movable barrier.
Figure 5:
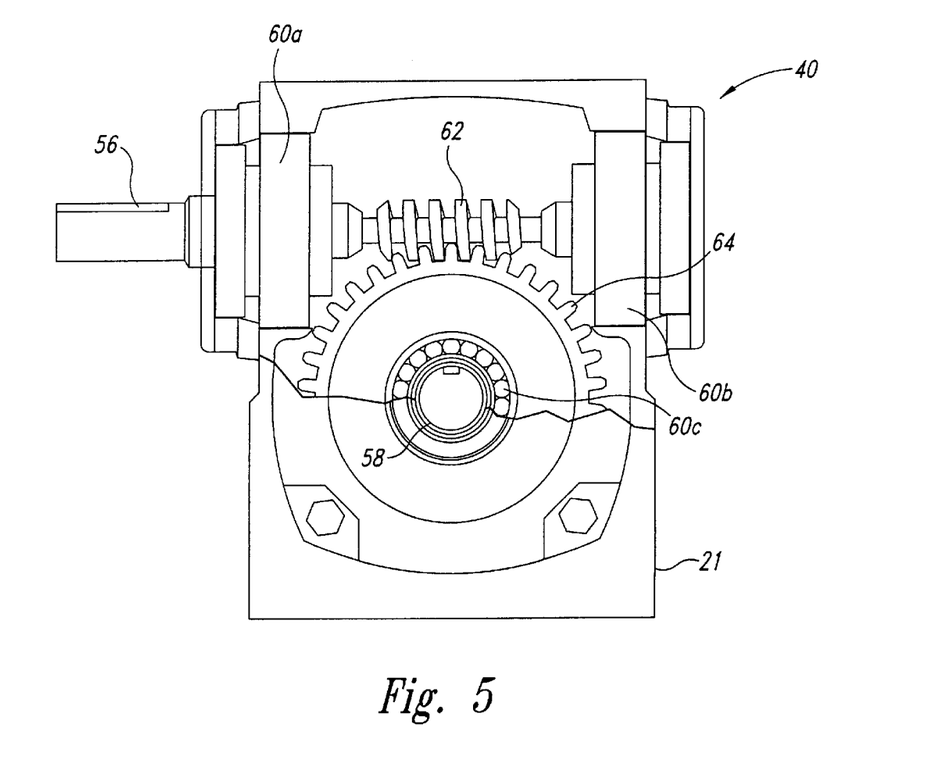
FIG. 5 is a sectional view of a gear box of the barrier operator of FIG. 4 used to transmit rotational force between a motor and a winch spool.

In addition to the first and second cables 22a and 22b, the station 21 of the barrier operator 10 includes a platform and two supports that are securely attached to a support foundation. The station 21 of the barrier operator 10 also has a drive system with drive system members including a cable spool 30 as best shown in FIG. 3. The spool 30 serves as an output for the station 21 and receives and dispenses the first and second cables 22a and 22b. In the depicted embodiment, an electrical motor 32 is the motive source that provides motive force for the barrier operator 10. However, other embodiments involve other motive sources such as hydraulic motors or compressed air, water, or other fluid turbines. The motor 32 provides its motive force to the spool 30 so that the spool turns either clockwise or counterclockwise indicated by direction arrows 3a and 3b, respectively. The motor 32 provides motive force to the spool 30 through a series of drive system members elements. These drive system members include a motor pulley 34 coupled to a rotating member such as a motor shaft (not pictured) of the motor 32. A belt 36 is received on the motor pulley 34 and a gear box pulley 38. The gear box pulley 38 is rotatably coupled to an input shaft 56 of a gear box 40 and an output shaft 58 of the gear box is rotatably coupled to the spool 30 (the input and output shafts 56 and 58 are shown in FIG. 5).

The combination of the first and second cables 22a and 22b and the spool 30 provide a vanging winch action for the barrier operator 10. According to this vanging action, as the spool 30 turns in the clockwise direction, indicated by direction arrow 3a of FIGS. 3 and 4, the first cable 22a unwraps from the spool whereas the second cable 22b wraps about the spool. Thus, as the spool 30 rotates in the clockwise direction 3a, the portion of the first cable 22a that is unwrapped and extending from the station 21 becomes longer and the unwrapped portion of the second cable 22b that extends from the station 21 becomes shorter. As best illustrated in FIGS. 1 and 2, as the unwrapped portion of the first cable 22a extending from the station 21 becomes longer, and the unwrapped portion of the second cable 22b extending from the station 21 becomes shorter, the movable barrier 12 moves toward the fully open position. When the opening 13 is sufficiently unblocked by the movable barrier, the vehicle 20 is allowed to pass through the opening. Alternatively if the spool 30 rotates in the counterclockwise direction indicated by direction arrow 3b of FIGS. 3 and 4, the unwrapped portion extending from the station 21 of the first cable 22a becomes shorter and the unwrapped portion of the second cable 22b extending from the station 21 becomes longer. As the unwrapped portions extending from the station 21 of the first and second cables 22a and 22b become shorter and longer respectively, the movable barrier 12 moves toward the fully closed position. When the opening 13 is sufficiently blocked by the movable barrier, the vehicle 20 is prevented from passing through the opening.

In other embodiments, the station 21 in the depicted embodiment is replaced by other stations having various drive system members that are coupled to a movable member of a motive source to provide motive force to first and second flexible members such as the first and second cables 22a and 22b attached to a movable barrier such as the movable barrier 12. Similar to the depicted embodiment, these portions of the first and second flexible members extending from the station of another embodiment become shorter or longer depending upon the direction of force applied to the drive system members of the station by the motive source and also depending upon the individual configuration of the various drive system members. Further embodiments include a different type of output drive system member in place of the spool 30. Additional embodiments include a plurality of spools or other types of output drive system members. Other types of output drive system members include drum, capstan, tong, finger, or various projections, chain drive, grooves, tracks, or other such arrangements in which the first and second flexible members can be wrapped and unwrapped or otherwise furled and unfurled around or alongside. One or a plurality of motive sources is operably coupled to the one or the plurality of output drive system members. Each of the plurality of output drive system members is coupled to one of the first or second flexible members.

Figure 4:
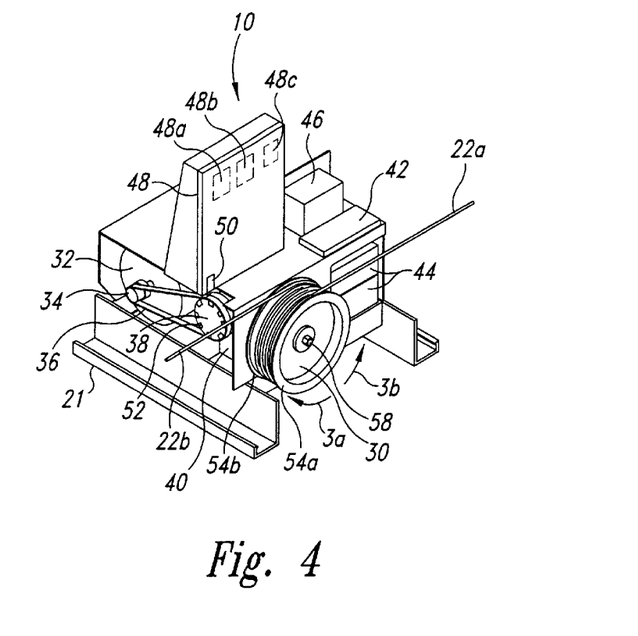
FIG. 4 is another enlarged, perspective view of the barrier operator of FIG. 2.

The motor 32 receives electrical power from a power system including a battery charger 42, batteries 44, an inverter 46, and a controller 48 with processor 48a and memory 48b, as shown in FIG. 4. A sensor 50 is electrically coupled to the controller 48 and operatively coupled to magnets 52 mounted to the gear box pulley 38 for rotation therewith. Operation of the sensor 50 and the magnets 52 will be discussed below.

In the depicted embodiment, the spool 30 is made of 356 cast aluminum, as a 1 inch bore with a ¼ inch keyway, and has a 7.483 inch diameter. The spool 30 further includes spaced-apart circumferentially extending flanges 54a and 54b. The flanges 54a and 54b are ¼ inch high to assist in retaining the first and second cables 22a and 22b wrapped on the spool 30. The distance between flanges 54a and 54b is 2.5 inches. In the depicted embodiment, the first and second cables 22a and 22b are separate individual cables and are each attached to the spool 30 by their one end so that slippage of the cables with respect to the spool does not occur. Attachment of the first and second cables 22a and 22b to the spool 30 is done by cable terminations (not shown). The cable terminations are located on the inner surfaces of flanges 54a and 54b of the spool 30. In an alternative embodiment, the spool 30 has a third flange in the center of the spool located between the flanges 54a and 54b to separate the first and second cables 22a and 22b on the spool. In an alternative embodiment, a single cable may be used with its two lengthwise half lengths serving as the first and second cables 22a and 22b. The central portion of the single cable may be passed through the center flange or attached to avoid slippage of the cable on the spool if the friction of the cable wrapped around the spool is insufficient.

An advantage of using the first and second cables 22a and 22b as separate cables is that the distance between the flanges 54a and 54b can be smaller than if a single cable is used. As a result, there is less load applied to the gearbox 40 and the overall size of the barrier operator 10 can be somewhat reduced. In the depicted embodiment, the first and second cables 22a and 22b are each two feet longer than the movable barrier 12. The spool 30 has a diameter sufficiently large such that for any position along the path of travel of the movable barrier 12, the portions of the first and second cable 22a and 22b that are wrapped around the spool 30 are wrapped only in a single layer. The first and second cables 22a and 22b have a 5/32 inch diameter and are 7/19 stranded stainless steel. In alternative embodiments, the first and second cables 22a and 22b are other types of flexible members, including, but not limited to, ropes, chains, wire, string, filament, strand, cordage, and thread of metal, plastic, nylon, other synthetic material, and other more naturally occurring materials, such as hemp and cotton, and other flexible members.

In the depicted embodiment, the first and second cables 22a and 22b are attached to the movable barrier 12 and the cable tensioners 24a and 24b, as described above. The cable tensioners 24a and 24b are adjustable to allow for adjustment of tension in the first and second cables 22a and 22b. In the depicted embodiment, the cable tensioners 24a and 24b are made of 356 cast aluminum. The cable tensioners 24a and 24b are fastened to the movable barrier with two 5/16 inch bolts for each cable tensioner. In an alternative embodiment, tension adjustment of the first and second cables 22a and 22b is accomplished by the spool 30 being manufactured in two halves that can be adjustably rotated in relation to one another and then locked in their relative rotational positions so as to then rotate as a unit to move the movable barrier 12.

Internal details of the gear box 40 are illustrated in FIG. 5. In thedepicted embodiment, the gear box 40 includes an input shaft 56 which has the gear box pulley 38 mounted thereon for rotation therewith. The gear box 40 further includes an output shaft 58 that has the spool 30 mounted thereon for rotation therewith. The input shaft 56 is coupled to a worm gear 62, rotatably supported at its ends by bearings 60a and 60b. A bearing 60c rotationally supports the output shaft 58. A worm wheel 64 meshes with the worm 62 and is coupled to the output shaft 58 to supply rotational drive thereto. The worm wheel 64 is rotatably supported by a bearing 60c.

The gear box 40 derives its beneficial characteristics from the gear coupling action between the worm 62 and the worm wheel 64. The worm 62 and the worm wheel 64 are configured such that rotational forces applied to the input shaft 56 are transferred to the output shaft 58 with the desired torque and speed of rotation. In the depicted embodiment, if rotational forces are applied to the input shaft 56 in either the counterclockwise or clockwise directions, the rotational forces will be transmitted to the output shaft 58 in the same counterclockwise or clockwise directions. The application of rotational force from the input shaft 56 to the output shaft 58 is the primary transmission mode of the gearbox 40.

The gearbox 40, however, has a secondary transmission mode. This secondary transmission mode occurs when rotational force is applied to the output shaft 58 and transmitted back to the input shaft 56. The configuration of the worm 62 and the worm wheel 64 allows rotational force applied to the output shaft 58 to be transmitted to the input shaft 56 under a special condition. This special condition exists when the total force applied to the input shaft 56 by the rotor 32 is less than a certain threshold force. This threshold force is typically very small, but is at least somewhat greater than the rotational force necessary to overcome the resistance experienced at the input shaft 56 resulting from the combined resistances of the gear box pulley 38, the belt 36, the motor pulley 34, and the motor 32 when the motor is deactivated and not receiving any electrical power from the power system.

Incorporating the concept of the threshold force into the design of the barrier operator 10 increases the utility of the barrier operator. In the primary transmission mode, when forces applied to the input shaft 56 of the gearbox 40 are greater than the threshold force, the gearbox effectively opposes forces applied to the output shaft 48 of the gearbox by amplifying the forces applied to the input shaft. In the primary transmission mode, the gearbox 40 either assists the motor 32 in moving the movable barrier 12 or opposes movement of the movable barrier by forces directly applied to the movable barrier. In the secondary transmission mode, when forces applied to the input shaft 56 of the gearbox 40 are less than the threshold force, the gearbox allows forces directly applied to the movable barrier 12 to move the movable barrier which is helpful for cases such as emergencies or power failures.

In the depicted embodiment the worm 62 has a major diameter of 0.958 inches, a thread depth of 0.225 inches, and a thread pitch of 0.237 inches. The worm wheel has 38 teeth. The configuration of the worm 62 and the worm wheel 64 results in a 19:1 gear ratio. Regarding the secondary transmission mode for a case where the gearbox 40 is not coupled to motor 32 and belt 36, a minimum of 1.3 foot pounds of torque must be applied to the output shaft 58 of the gearbox at 70° F. with standard gear oil for the input shaft 56 of the gearbox to rotate with no rotational force being applied to the input shaft. The 1.3 foot pounds of torque and any drag of the motor 32 and belt 36 are all relatively small and allow for manual movement of the movable barrier 12 when the electrical power is not available to energize the motor 32. Other embodiments use gear boxes, exposed gears, a series or pair of pulleys, various belt drives, sprockets, or other force converters alone or in various combinations. These force converters may have higher minimum torque requirements while still allowing for manual movement of the movable barrier 12.

The ratio of the gear box pulley 38 to the motor pulley 34 is three to one. In the depicted embodiment the gear box pulley 38 has a diameter of 3.3 inches. The gear box pulley 38 is made of 6061 T6 aluminum. The gear box pulley 38 has a ¾ inch bore with a 3/16 inch keyway and is designed to accommodate a standard six groove micro-V profile belt. Six magnets 52 are embedded in the gear box pulley 38 and are used in dynamic and kinematic sensing and the analysis discussed below. The motor pulley 34 has a 1.1 inch diameter and is made from a 12L14 leadoy material. The motor pulley 34 also has a standard six groove micro-V profile with a ⅝ inch diameter bore with a 3/16 inch keyway. The belt 36 that couples the motor pulley 34 and the gear box pulley 38 has a micro-V profile. The depicted embodiment uses a micro-V profile belt made by Gates Rubber having part number 240J6 for the belt 36.

Figure 6:
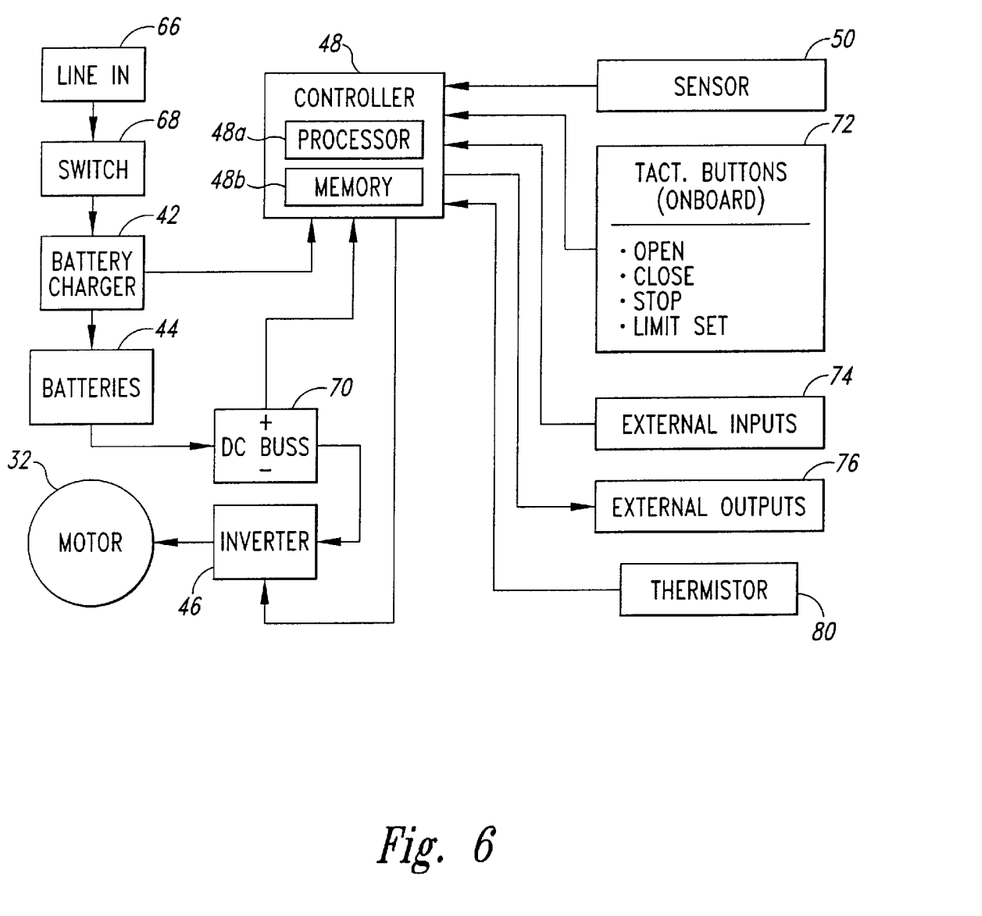
FIG. 6 is a schematic drawing of electrical power and electronic control systems of the barrier operator of FIG. 4.

A schematic drawing of FIG. 6 shows the functional relationships between components of the barrier operator 10 involved with power, control, and generation of motion. In the depicted embodiment, a power source 66, such as a conventional power line, provides 115 volt AC electrical power. A power switch 68 controls supply of electrical power from the power source 66. When permitted by the power switch 68, electrical power flows from the power source 66 to the battery charger 42. The battery charger 42 is connected to the batteries 44 and supplies charging current thereto. As will be described below, the batteries 44 provide the electrical power to operate the motor 32. Alternative embodiments utilize batteries solely as standby power supplies for emergency back-up purposes whereas under normal operation electrical power is supplied to the motor 32 without the use of batteries.

In an alternative embodiment, a switch mode power supply receives the electrical power from the power switch 68 to condition the electrical power before it is received by the battery charger 42. In the alternative embodiment, the switch mode power supply allows the barrier operator 10 to use electrical power with input voltages over broad ranges including but not limited to a range between 70 and 290 volts, and 50 to 60 Hz AC. The battery charger 42 in the depicted embodiment operates at 115 volts AC and 5 amps RMS to give an output appropriate for charging a 24 volt battery system. Other embodiments include additional power supply equipment as appropriate for the size and type of the movable barrier 12 and situation involved. Additional power supply equipment includes smaller or larger capacity power supplies and, for backup purposes, larger and/or additional batteries.

In another alternate embodiment, solar photovoltaic panels are used to directly charge the batteries 44. Since as shown in the depicted embodiment the inverter 46 of the gate operator 12 is electrically coupled to the DC buss 70, the gate operator is readily adaptable to remote applications using solar panels.

The battery charger 42 is electrically coupled to the controller 48 and sends a signal to the controller upon a power failure. If power fails, the controller 48 initiates an energy conserving mode and executes one of several possible power failure methods discussed below.

The batteries 44 in the depicted embodiment consist of two 12 volt batteries each having a 7 amp-hour rating. The two batteries 44 are connected in series to provide 24 volt, 7 amp-hour capacity. The batteries 44 provide electrical power to the controller 48 and the inverter 46 through a DC bus 70 having a positive and negative bus voltage. Other embodiments use batteries 44 of various voltages and amp-hour capacities.

The inverter 46 uses pulse width modulation to produce a constant voltage three-phase AC electrical output with variable frequency. For each phase of the three-phase output, a pair of MOSFET transistors controls the electrical output. The pair of MOSFET transistors includes one MOSFET transistor connected to the positive bus voltage of the DC bus 70 and another MOSFET transistor connected to the negative bus voltage of the DC bus 70. By alternately switching between the positively and negatively connected MOSFET transistors of each pair, an alternating voltage is produced which results in the three-phase AC electrical output. The MOSFET transistors are switched at a very high frequency with varying time intervals to optimize the three-phase output of the inverter 46 which is supplied to the motor 32.

In the depicted embodiment, the electrical output provided by the inverter 46 to the motor 32 is a three-phase AC having a nominal root mean square (RMS) voltage between each phase of 16.75 volts at 60 Hz and above. When the motor 32 is at rated full load, the inverter 46 supplies approximately 23 amps RMS of electrical current. However, the inverter 46 is rated for a 60 amp RMS maximum output. The inverter 46 controls the frequency and the voltage of the three-phase output which ranges between 0–180 Hz and 0–20 volts. The controller 48 is electrically coupled to the inverter 46 to provide control of the inverter 46 including control of the frequency and the voltage of the three-phase electrical output to the motor 32. In alternative embodiments, the inverter 46 is supplied with DC electrical power having a voltage smaller or greater than 24 volts including 12, 36, 48, 60, and 72 volts or other voltages. In these alternative embodiments, the inverter 46 supplies three-phase AC electrical power to the motor 32 having voltage levels between each phase less than or equal to 65 volts RMS. In alternative embodiments only frequency or voltage of the electrical power supplied to the motor 32 is adjusted, but not both frequency and voltage.

In the depicted embodiment, the motor 32 operates at approximately 16.75 volts RMS, three-phase, four pole motor with a half horsepower maximum rated output. At rated full load, the motor 32 requires approximately 23 amp RMS current. The motor 32 in the depicted embodiment uses 18 inches of 10 gage wire for its leads. The rotational speed of the motor 32 is primarily dependent upon the frequency and the voltage of the electrical power supplied to the motor by the inverter 46. Thus, the inverter 46 can control the rotational speed of the motor 32 by varying the frequency and the voltage of supplied electrical power to the motor. As stated, in the depicted embodiment, the frequency of the electrical power supplied to the motor 32 ranges from 0 to 180 Hz. In other embodiments, different motors of other voltage, pole, and horsepower specifications are used.

The controller 48 is electrically coupled to the sensor 50, tactile buttons 72, external inputs 74, external outputs 76 and a thermistor 80 or other temperature sensors. Based upon inputs from these various sources, the controller 48 determines the proper frequency and voltage for the electrical power supplied by the inverter 46 to the motor 32 which results in a particular rotational speed of the motor and a resultant speed for the movable barrier 12. For instance in the depicted embodiment, when electrical power having a 60 Hz frequency is supplied to the motor 32, the resultant speed of the movable barrier 12 is twelve inches/second. The direction that the motor 32 rotates is determined by the phase relationship between the three phases of the electrical power supplied by the inverter 46 to the motor 32. Thus, the controller 48 can change the direction of movement of the movable barrier 12 by changing the phase relationship between the three phases of the electrical power supplied by the inverter 46 to the motor 32. Alternative embodiments include adjustments of the frequency and/or the voltage of the electrical power supplied to the motor 32 and/or adjusting transmission ratios of the drive system of the barrier operator 10 according to particular torque requirements of an application.

The tactile buttons 72 include "open," "close," "stop," and "limit set" tactile buttons. Manual activation of the open, close or stop tactile buttons 72 directs the controller 48 to move the movable barrier 12 to the fully open position, the fully closed position, or to stop movement of the movable barrier. The limit set tactile buttons 72 are used in calibrating positions of the movable barrier as discussed below. The external inputs 74 include key switches, card readers, radio signals, key punch pads, traffic detectors, photo eye outputs, pressure sensors, timer outputs, induction loops 18a and 18b, telephone entry devices, ultrasonic detectors, radar detectors and computer generated signals. The external outputs 76 include signals indicating barrier position, alarm signals, light indicators, control signals, and other computer instruction signals. The manner in which the controller 48 uses these various input sources to determine the frequency and the voltage of the electrical power provided to the motor 32 will be discussed further below.

Inherent characteristics of the motor 32, the gear box 40, and the controller 48 enhance the amount of control that the barrier operator 10 has in moving the movable barrier 12. One characteristic of the motor 32 and the controller 48 is that they resist being forced to turn faster than the motor's three phase synchronous speed. The synchronous speed of the motor 32 is dependent upon the frequency and the voltage of the electrical power supplied to the motor. Thus, if the controller 48 sets the synchronous speed of the motor 32 at a rate lower than the current speed of the movable barrier 12, the motor will provide resistance in a braking fashion to slow down the speed of travel of the movable barrier. In addition, as discussed above, the gear box 40 resists forces applied to the output shaft 58 of the gear box that are counter to forces applied to the input shaft 56 of the gear box. Thus, the gear box 40 assists the motor 32 in accelerating and decelerating the movable barrier 12. The combination of the motor 32 and the gear box 40 allows the barrier operator 10 to control heavy and fast moving gates in a smooth manner.

In the depicted embodiment, the sensor 50 and the magnets 52 (see FIGS. 3 and 4) are configured to supply position information to the controller 48. The magnets 52 are embedded around the perimeter of the gear box pulley 38 with alternating north and south poles. The sensor 50 is an Allegro part No. 3422 and is positioned so that as the gear box pulley 38 rotates, the magnets 52 pass by the sensor. The magnets 52 are oriented so that as the magnets pass by the sensor 50 with alternating pole arrangements. The controller 48 using the sensor 50 determines direction, speed, as well as position of the movable barrier 12 by methods known in the art. Position is determined by the controller 48 counting and summing the pulses generated by the sensor 50. In a depicted embodiment, the combination of the controller 48, the sensor 50, and magnets 52 are able to provide position information on the movable barrier 12 to a resolution of 0.21 inches. The controller 48 determines position using a counter circuit that counts the electrical pulses induced each time one of the magnets 52 passes the sensor 50. The counter circuit compares its count relative to the fully open and fully closed positions to determine the present position of the movable barrier 12. A method outlined in FIG. 7 is used on initial setup and also after an extended power outage.

An alternative embodiment employs for position determination a photoelectric transmitter and sensor and materials of various optical characteristics affixed to a moving member such as the gear box pulley 38. Another embodiment employs for position determination a potentiometer operatively coupled to a moving member such as the gear box pulley 38. Electrical resistance of the potentiometer varies according to the position of the movable barrier 12.

Figure 7:
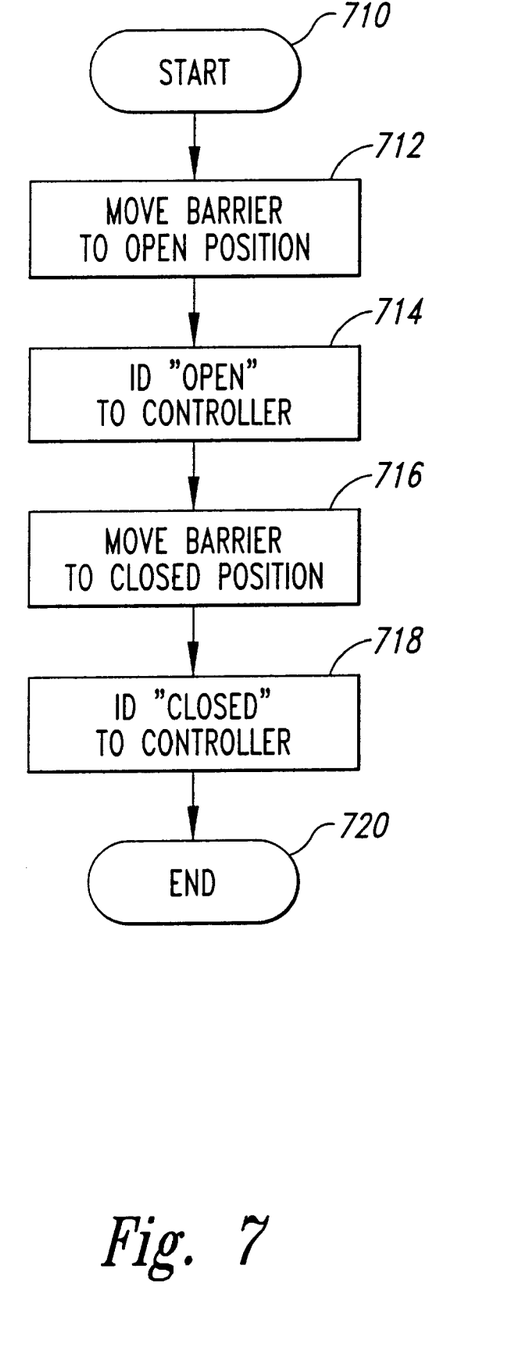
FIG. 7 is a flowchart of a method used for position calibration.

A method for calibrating the position of the movable barrier 12 in the depicted embodiment is illustrated in FIG. 7. The method first starts at step 710 and goes to step 712 where the movable barrier 12 is moved either manually or automatically to a position referred to as the "fully open position." In the fully open position, the opening 13 is unblocked and fully accessible. The method then goes to step 714 where the limit set tactile buttons 72 are either manually or automatically activated to confirm to the controller 48 that the movable barrier 12 is in the fully opened position. The method then goes to step 716 where the movable barrier 12 is either manually or automatically moved to a position referred to as the "fully closed position." In the fully closed position, the opening 13 is fully blocked by the movable barrier 12. The method then goes to step 718 where the limit set tactile buttons 72 are either manually or automatically activated to confirm to the controller 48 that the movable barrier 12 is in the fully closed position. The method then goes to step 720 where the method ends.

Both the fully open and fully closed positions indicated to the controller 48 are stored in the memory 48b of the controller (see FIG. 4). Once the fully closed and fully opened positions are stored in the memory 48b of the controller 48, the controller is able to determine with its processor 48a and counts of the counter circuit mentioned above the position of the movable barrier 12 to the resolution of 0.21 inches. The controller 48 also uses an internal clock 48c along with the position information supplied by the sensor 50 to determine velocity, acceleration or deceleration, and rate of acceleration or deceleration of the movable barrier. The controller 48 also accounts for direction of movements since the movable barrier 12 is capable of moving in more than one direction. Use of position and time data to determine velocity, acceleration, and rate of acceleration of objects is well known in the field of kinematics.

Figure 8:
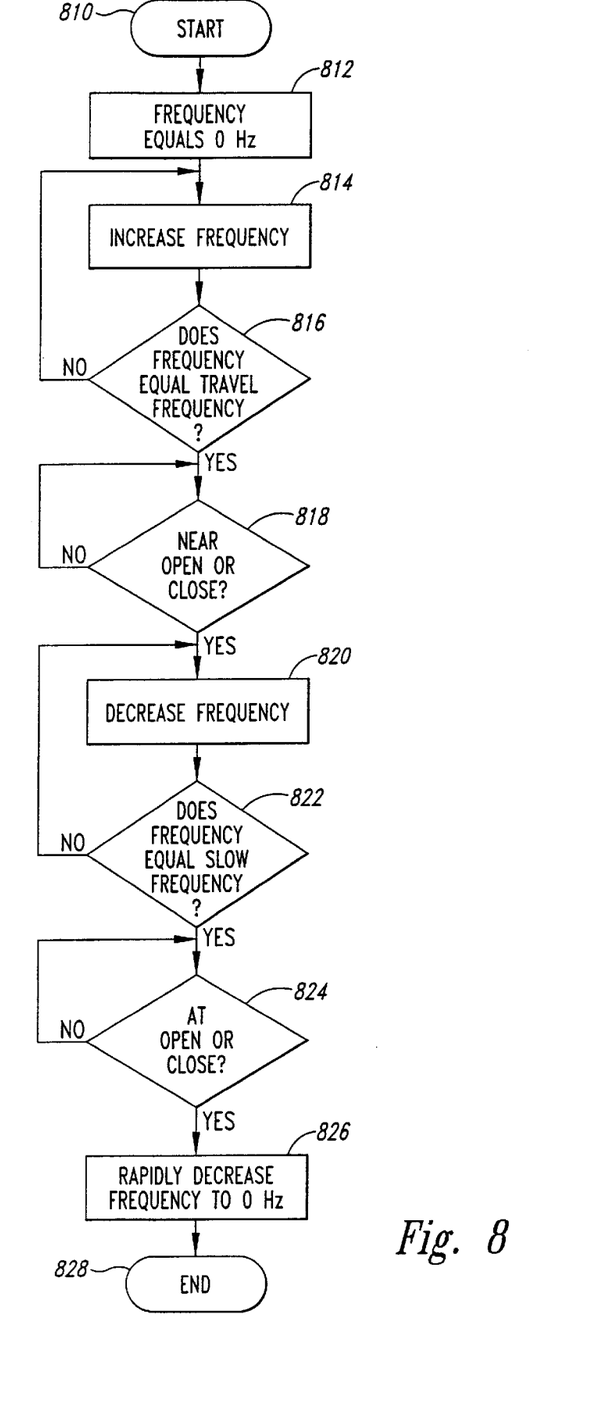
FIG. 8 is a flowchart of a method used in controlling travel of the movable barrier.

In the depicted embodiment, the controller 48 executes a preprogrammed method to move the movable barrier 12. This method generally moves the gate from the fully open to the fully closed position, or from the fully closed position to the fully open position. As illustrated in FIG. 8, the method starts at step 810 and goes to step 812 where the frequency of the electrical power supplied to the motor 32 is 0 Hz. This 0 Hz frequency is the initial starting frequency for movement of the movable barrier 12 from either the fully closed position to the fully open position, or from the fully open position to the fully close position.

The method then goes to step 814 where the controller 48 changes the output of the inverter 46 so that the electrical power supplied to the motor 32 increases in frequency and voltage. The increase in frequency and voltage in the depicted embodiment is linear allowing for a smooth increase in speed of the movable barrier 12. In other embodiments, the controller 48 increases the frequency and voltage according to piece-wise linear or non-linear functions that are typically continuous functions of frequency of the electric power supplied by the inverter 46 to the motor 32 versus the position of the movable barrier 12 to allow for smooth acceleration. The controller 48 continues to increase the frequency and voltage of the electrical power supplied from the inverter 46 to the motor 32 until the frequency equals a predetermined frequency designated as the "travel frequency" in decision step 816. Different predetermined frequencies and voltages are assigned as the travel frequency depending upon whether the situation calls for slower or faster travel speeds of the movable barrier 12 than a typical travel speed. In the depicted embodiment the typical travel frequency is 60 Hz which results in a travel speed for the movable barrier 12 of twelve inches per second. The decision step 816 branches under the NO condition back to the step 814 until the frequency equals the travel frequency wherein decision step 816 branches under the YES condition to decision step 818.

In decision step 818 the controller 48 determines whether the movable barrier 12 is near either the fully open position or fully closed position. If the movable barrier 12 is near neither the fully open position or the fully closed position, the decision step 818 branches under the NO condition back to decision step 818 where the movable barrier continues to move at its predetermined travel speed. When the controller 48 determines that the movable barrier 12 is near either the fully open position or the fully closed position, the decision step 818 branches under the YES condition to step 820 where the controller linearly decreases the frequency and the voltage allowing for a smooth decrease in speed of the movable barrier as the movable barrier approaches the fully open or closed position it is near and goes to step 822. In other embodiments, the controller 48 decreases the frequency and the voltage according to piece-wise linear or non-linear functions that are typically continuous functions of the frequency of the electric power supplied by the inverter 46 to the motor 32 versus the position of the movable barrier to allow for smooth deceleration.

In decision step 822, the controller 48 determines whether the frequency equals a predetermined slow frequency. In the depicted embodiment the slow frequency is selected to be approximately 20 Hz which results in travel of the movable barrier of four inches per second. If not, the decision step 822 branches under the NO condition back to step 820 where the frequency and the voltage is again decreased. In a depicted embodiment, the frequency and the voltage is decreased in step 820 in a linear fashion. If the frequency equals the slow frequency, the decision step 822 branches under the YES condition to decision step 824 where the controller 48 determines whether the movable barrier 12 has reached either the fully open position or the fully closed position. If not, the method branches under the NO condition back to step 824 to allow the movable barrier 12 to move at the speed corresponding to the slow frequency. If the movable barrier 12 is at either the fully open position or the fully closed position, the method then branches under the YES condition to step 826 where the controller 48 rapidly decreases the frequency and the voltage being supplied by the inverter 46 to the motor 32 until the frequency equals 0 Hz. The method then branches to step 828 wherein the method ends.

In further embodiments, modifications of the method illustrated in FIG. 8 are used by the controller 48 to move the movable barrier 12 from positions other than fully open and fully closed positions or in other situations. The controller 48 increases and decreases the frequency and the voltage of the power supplied by the inverter 46 to the motor 32 in a linear manner. However, the predetermined travel speed of movable barrier 32 may be decreased or increased, or the acceleration or deceleration of the movable barrier 12 may be decreased or increased based on the particular situation involved and the position of the movable barrier 12 before movement starts. For instance, if the position before movement of the movable barrier 12 is very near either the fully open position or the fully closed position, acceleration and travel speed of the movable barrier 12 may be decreased. Whereas, if any external input indicates that an unidentified vehicle is tailgating an authorized vehicle, the values for the acceleration, the travel speed and subsequent deceleration of the movable barrier 12 may be increased. In other embodiments, the controller 48 adjusts both the frequency and the voltage level of the electrical power supplied to the motor 32.

In alternative embodiments, if the open tactile buttons 72 is manually activated when the barrier operator 10 is moving the movable barrier 12 into the fully closed position, the controller 48 will rapidly decrease the frequency and the voltage of electrical power supplied by the inverter 46 to the motor 32 until it reaches 0 Hz. The controller 48 will then execute the method indicated in FIG. 8 to move the movable barrier 12 to the fully open position.

If the stop tactile button 72 is manually activated, the controller 48 will rapidly change the frequency and the voltage of the power supplied by the inverter 46 to 0 Hz. Any close commands issued through the close tactile button 72 will initiate a stop function by the controller 48 while the movable barrier 12 is moving open. Other embodiments incorporate electrical signals received by the controller 48 from one or more of the external inputs 74 to initiate operations similar to the open, close, stop, and limit set operations initiated by the tactile buttons 72.

Further embodiments include an automatic repositioning feature, with the controller 48 continuously monitoring the position of the movable barrier 12. The repositioning feature counters unauthorized attempts to move the movable barrier 12 or drifting of the barrier caused by environmental factors such as weather or positioning of the movable barrier. Furthermore, the repositioning feature provides benefits of a lock system, but does not require all the additional hardware that a typical lock system would require. If the movable barrier is moved without assistance by the motor 32, the sensor 50 will indicate a change in position at a time when the frequency of the power supplied by the inverter 46 to the motor will be at 0 Hz. If the movable barrier 12 moves without the assistance of the motor 32, the controller 48 will move the movable barrier back to the most recent position that the movable barrier was placed by the motor (i.e., the "original position"). As stated, the controller 48 determines the position of the movable barrier 12 within 0.21 inches for the depicted embodiment. Thus, if the movable barrier 12 is moved out of its original position by something other than the barrier operator 10 by an amount approximately greater or equal to 0.21 inches, the controller 48 will cause the inverter 46 to energize the motor 32 with electrical power tailored to reposition the movable barrier at the original position and thus resist the external force being applied to the movable barrier. This tailored electrical power in the depicted embodiment is approximately 3 volt RMS, 5 amp RMS, 2 to 5 Hz, 3-phase electrical power having the proper voltage and frequency to move the movable barrier back to its original position. Once the barrier operator 12 returns the movable barrier to the original position, the controller 48 causes the inverter 46 to stop supplying electrical power to the motor 32.

If the movable barrier 12 is moved out of the original position again by something other than the barrier operator 10, the barrier operator will again return the movable barrier back to the original position once the movable barrier has traveled approximately greater than or equal to 0.21 inches. The response time for the barrier operator 10 to start to return the movable barrier 12 back to the original position is approximately 50 ms in the depicted embodiment. This repositioning feature essentially acts as a lock to keep the movable barrier 12 in a fixed position against externally applied forces. A linear force of at least approximately 480 lbs. must be applied to the movable barrier 12 to defeat this lock feature by preventing the barrier operator 10 from returning the movable barrier to the original position.

Under a first energy conserving feature, the controller 48 senses the absence of AC electrical power supplied to the charger 42 and enters one of several modes including automatic open, lock open after next open command, stay closed except special override, or normal full function until the batteries 44 are substantially discharged and followed by open and lock open. Additionally, the controller 48 continues to sense the voltage levels on the DC bus 70. As the batteries 44 become partially discharged, the voltage level on the DC bus 70 will start to decrease in a manner well known in the art. Once the voltage level on the bus 70 decreases to a particular level that indicates that the batteries 44 have not been continually charged by the charger 42, such as during a prolonged power outage with the power source 66 not supplying power to the battery charger 42, the controller 48 will go into a second energy conserving mode. In the second energy conserving mode, the controller 48 adjusts the frequency and/or voltage level of the electrical power supplied by the inverter 46 to the motor 32 so that the batteries 44 are less rapidly drained. As a result, a maximum limit of 30 Hz frequency is imposed on the electrical power supplied from the inverter 46. When the batteries 44 are semi-discharged, the operating velocity with which the barrier operator 10 moves the movable barrier 12 is limited. Also, in the second energy conserving mode, the repositioning feature described above is inactivated when the batteries become substantially discharged such as below 50% capacity which allows the movable barrier 12 to be manually moved during power outages allowing access for medical and other emergency personnel that may otherwise be hindered from rendering aid. These first and second energy conserving modes are used either separately or in combination in other embodiments. Alternative embodiments of energy conserving modes also limit voltage either alone or in combination with the frequency limit for power supplied by the inverter 46.

The controller 48 also uses external inputs 74 to modify how the barrier operator 10 moves the movable barrier 12. For instance, the external inputs 74 of the depicted embodiment include induction loops 18a and 18b that sense the presence of a vehicle. In the depicted embodiment the barrier operator 10 rapidly stops the movable barrier 12 from moving any further to the fully open position once a vehicle starts to pass over the second encountered induction loop in the vehicle's direction of travel. For the case shown in FIG. 1, the second encountered induction loop is the induction loop 18b based on the direction of travel of the vehicle 20 indicated by direction arrow 12a of FIG. 1. However, if the vehicle 20 is traveling in the opposite direction, indicated by direction arrow 2b, the second encountered induction loop would be loop 18a. The vehicle 20 starts to pass over the second encountered induction loop (18b in this case) once the vehicle's front portion 20a crosses the line 2c and reaches the side indicated by cross 2d shown in FIG. 1. Once the vehicle's rear portion 20b is past the second encountered induction loop (18b in this case) on the side of line 2e indicated by cross 2f of FIG. 1, the gate operator 10 starts to move the movable barrier 12 toward the fully closed position.

As a result, the gate operator 10 adjusts the length of travel of the movable barrier to accommodate for the speed of travel and the size of the vehicle 20. Another result is to discourage drivers of additional vehicles from tailgating behind the vehicle 20 in order to pass through the opening 13 based on permission to pass granted to the vehicle 20. In other embodiments the barrier operator 10 uses various other sensing mechanisms to determine the position of the vehicle 20 or other mobile objects relative to the opening 13 and movable barrier 12 in place of or in addition to the induction loops 18a and 18b. Other embodiments include quick stop features which prevent the movable barrier 12 from hitting obstructions sensed by other external inputs 74 such as infrared and photoelectric sensors.

The controller 48 in one embodiment compares position and speed determinations based on both the frequency of the electrical power supplied to the motor and data supplied by the sensor 50. The controller 48 stops the barrier and issues a warning through one of the external outputs 76 such as alarm signals or light indicators if the position or velocity based on frequency and sensor data are different. The warning is associated with conditions such as the motor 32 rotating faster than that predicted by the movement of the movable barrier 12 as indicated by the sensor 50. When the motor 32 is rotating faster or slower than it should be for the velocity of the movable barrier 12, a condition may exist wherein something in the barrier operator 10 has broken or is slipping such as the belt 36. Because slip is high on startup, the comparative circuit is not active for the first 1.5 seconds of each start.

The controller 48 also is programmed to use temperature data supplied by the thermistor 80 to effectively use the motor 32 as a heater for the electronics, batteries 44 and the gear box 40 of the gate operator 10. If the thermistor 80 senses that the ambient temperature near the controller has dropped below a first temperature threshold such as 30° F. and thus potentially resulting in impairment of operations of the controller, the batteries, or the gear box, the controller 48 will switch the barrier operator 10 to a heater mode and cause the inverter 46 to supply the motor 32 with electrical power having a frequency at or near 0 Hz which does not result in rotation of the motor or movement of the movable barrier 12. With this power supplied, the motor 32 will produce approximately 150 watts of heat. As this heat causes the ambient temperature to rise past a second temperature threshold such as 35° F., as sensed by the thermistor 80 in the area of the barrier operator electronics, the controller 48 signals the inverter 46 to stop supplying electrical power to the motor 32. In alternative embodiments, the thermistor 80 is replaced by a thermostat, or other temperature sensing device. If the controller 48 senses that power has failed, indicated by the loss of AC electrical power to the battery charger 42, the inverter 46 will not cause the motor 32 to act as a heater. Instead, the controller 48 will conserve remaining energy stored in the battery 44 for moving the movable barrier 12. As a secondary benefit of the heater mode of operation of the barrier operator 10, the motor 32 offers partial resistance to forces applied to the motor pulley 34 so that at least approximately 80 pounds of linear force is required to move the movable barrier 12.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. A barrier operator to move a movable barrier along a path, the barrier operator comprising:
   a three phase alternating current electric motor having a motor shaft;
   an electrical inverter having an inverter input and an inverter output, the inverter input being electrically coupled to a direct current electrical power source, and the inverter output being electrically coupled to the three phase alternating current electric motor, the inverter being configured to supply three phase electrical power to the electric motor with a voltage difference only less than or equal to 65 volts root mean square between any two of the three phases; and
   a station including a drive system with at least one drive system member operably coupled to the motor shaft and with at least one drive system member operably coupled to the movable barrier.

2. The barrier operator of claim 1, further comprising a controller electrically coupled to the inverter, the controller being configured to adjust at least one of frequency and voltage through a continuous range of the electrical power supplied by the inverter to the three phase alternating current electric motor based upon positions of the movable barrier along the path.

3. The barrier operator of claim 1, further comprising a controller electrically coupled to the inverter, the controller being configured to control at least one of frequency and voltage of the electrical power supplied by the inverter to the three phase alternating current electric motor, the controller linearly increasing the frequency from 0 Hz to a travel frequency and linearly decreasing the frequency from the travel frequency to a slower frequency based upon a position of the movable barrier along the path.

4. The barrier operator of claim 1, further comprising a controller electrically coupled to a position sensor, the controller being configured to record sensor readings associated with a fully open position and a fully closed position of the movable barrier to be used in determining positions of the movable barrier.

5. The barrier operator of claim 1, further comprising a controller electrically coupled to the inverter, the controller being configured to control at least one of frequency and voltage of the electrical power supplied by the inverter to the three phase alternating current electric motor, the controller linearly increasing and decreasing the frequency within a range of no less than 0 Hz and no greater than 180 Hz.

6. The barrier operator of claim 1, further comprising a controller electrically coupled to the inverter and external inputs, the controller being configured to control at least one of frequency and voltage of the electrical power supplied by the inverter to the three phase alternating current electric motor based upon electrical signals from the external inputs, the external inputs include at least one of the following: key switches, card readers, radio signals, key punch pads, traffic detectors, photo eye outputs, pressure sensors, timer outputs, induction loops, telephone entry devices, ultrasonic detectors, radar detectors, and computer generated signals.

7. The barrier operator of claim 1 wherein the drive system is configured to provide a vanging winch action.

8. The barrier operator of claim 1, further comprising a controller electrically coupled to a position sensor, the controller being configured to determine when the movable barrier has moved along the path without assistance from the three phase alternating current electric motor based upon a change in position of the moveable barrier along the path as indicated by the position sensor and by a frequency of the electrical power supplied to the three phase alternating current electric motor by the inverter during the change in position of the movable barrier along the path.

9. The barrier operator of claim 1, further comprising a controller controlling the inverter to supply a repositioning electrical power to the three phase alternating current motor to maintain the movable barrier at a selected position along the path to which the movable barrier was moved by the three phase alternating current electric motor, the repositioning electrical power being selected by the controller sufficient to reposition the movable barrier back to the selected position when the movable barrier is moved therefrom other than by the three phase alternating current electric motor.

10. The barrier operator of claim 1, further comprising a controller controlling the inverter to vary both frequency and voltage level of the electrical power supplied by the inverter to the three phase alternating current electric motor.

11. The barrier operator of claim 1 wherein the inverter is configured to use pulse width modulation for the electrical power supplied to the three phase alternating current electric motor.

12. The barrier operator of claim 1, further comprising:
    a charger electrically coupled to the inverter; and
    a controller configured to determine absence of electrical power supplied to the inverter and voltage levels of power supplied to the inverter, and adjust at least one of frequency and voltage of the electrical power supplied by the inverter to the three phase alternating current electric motor based upon at least one of the following: absence of electrical power supplied to the charger and determined voltage levels of power supplied to the inverter.

13. The barrier operator of claim 1, further comprising a controller and a temperature sensor, the controller being configured to control the inverter to supply electrical power having a frequency at or near 0 Hz to the three phase alternating current electric motor with an insufficient magnitude of frequency to move the movable barrier if the temperature sensor senses a temperature below a threshold temperature, the electrical power supplied to the three phase alternating current motor being sufficient to produce heating thereof with the heat produced being transmitted by the three phase alternating current electric motor to at least a portion of a surrounding environment.

14. The barrier operator of claim 1, further comprising a controller configured to adjust at least one of deceleration rate and deceleration distance of the movable barrier.

15. A barrier system comprising:
   a movable barrier configured to travel along a path;
   a three phase alternating current electric motor having a motor shaft, the motor being configured to operate on three phase alternating current with voltage differences of only less than or equal to 65 volts root mean square between any two of the three phases; and
   a drive system with at least one drive system member operably coupled to the motor shaft and at least one drive system member operably coupled to the movable barrier.

16. The barrier operator of claim 15, further comprising a controller electrically coupled to the three phase alternating current electric motor, the controller being configured to adjust at least one of frequency and voltage through a continuous range of electrical power supplied to the three phase alternating current electric motor based upon position of the movable barrier along the path.

17. The barrier system of claim 15 wherein the three phase alternating current electric motor operates on three phase alternating current between a frequency range of no less than 0 Hz and no greater than 180 Hz.

18. The barrier system of claim 15 wherein the movable barrier comprises one of the following: a gate and a door.

19. The barrier system of claim 15, further comprising a controller configured to adjust at least one of deceleration rate and deceleration distance of the movable barrier.

20. The barrier operator of claim 15, further comprising a controller controlling the inverter to supply a repositioning electrical power to the three phase alternating current motor to maintain the movable barrier at a selected position along the path to which the movable barrier was moved by the three phase alternating current electric motor, the repositioning electrical power being selected by the controller sufficient to reposition the movable barrier back to the selected position when the movable barrier is moved therefrom other than by the three phase alternating current electric motor.

21. The barrier operator of claim 15, further comprising a controller and a temperature sensor, the controller being configured to control the inverter to supply electrical power having a frequency at or near 0 Hz to the three phase alternating current electric motor with an insufficient magnitude of frequency to move the movable barrier if the temperature sensor senses a temperature below a threshold temperature, whereby the electrical power supplied to the three phase alternating current motor produces heating thereof with the heat produced being transmitted by the three phase alternating current electric motor to at least a portion of a surrounding environment.

22. A barrier operator to move a movable barrier along a path, the barrier operator comprising:
   an electric motor having a motor shaft operably coupled to the movable barrier; and
   a controller configured to control electrical power to the electric motor to maintain the movable barrier at a selected position along the path to which the movable barrier was moved by the electric motor, the the controller further configured to direct electrical power to the electric motor sufficient to reposition the movable barrier back to the selected position, the controller further configured to begin directing the electrical power to the electric motor immediately after at least one of the following: a period of no more than one second has elapsed from a point in time in which the movable barrier has begun to be moved therefrom other than by the electric motor and the movable barrier has traveled no more than two inches therefrom other than by the electric motor.

23. A barrier operator to move a movable barrier along a path, the barrier operator comprising:
   one or more batteries configured to supply direct current electrical power;
   a three phase alternating current electric motor having a motor shaft operably coupled to the movable barrier, the alternating current electric motor energetically linked to the one or more batteries to receive alternating current electrical power at or below 65 volts root mean square;
   a temperature sensor; and
   a controller configured to control electrical power supplied to the three phase alternating current electric motor, the electrical power having an insufficient magnitude to move the movable barrier if the temperature sensor senses a temperature below a threshold temperature, whereby the electrical power supplied to the three phase alternating current motor produces heating thereof with the heat produced being transmitted by the three phase alternating current electric motor to at least a portion of a surrounding environment.

24. A gate operator to move a movable gate along a path, the gate operator comprising:
   a three phase alternating current electric motor having a motor shaft operably coupled to the movable gate, the three phase alternating current electric motor being supplied with electrical power, the electrical power having a frequency; and
   a controller electrically coupled to the three phase alternating current electric motor, the controller configured to adjust through a continuous range at least one of frequency, voltage, and pulse width of the electrical power supplied to the three phase alternating current electric motor based upon positions of the movable gate along the path.

25. A gate operator to move a movable gate along a path, the gate operator comprising:
   a three phase electric motor having a motor shaft operably coupled to the movable gate;
   a position sensor configured to sense positions of the movable gate along the path; and
   a controller electrically coupled to a position sensor and the three phase electric motor, the controller being configured to record sensor readings associated with a fully open position and a fully closed position of the movable gate to be used in determining positions of the movable gate, the controller being further configured to adjust through a continuous range at least one of frequency, voltage, and pulse width of electric power supplied to the three phase electric motor based upon positions of the movable gate along the path sensed by the position sensor.

26. A method for a gate operator that moves a movable gate, the method comprising:
   moving the movable gate to a fully open position;
   identifying the fully-open position to a controller;
   recording reference data associated with the fully-open position of the movable gate;

moving the movable barrier to a fully-closed position;

identifying the fully-closed position to the controller;

recording reference data associated with the fully-closed position of the movable gate;

determining a subsequent position of the movable gate based upon the recorded reference data of the fully-open and fully-closed positions of the movable gate; and adjusting at least one of voltage, frequency, and pulse width over a continuous range of electrical power supplied to a three phase electric motor based upon the subsequent position of the movable gate.

27. The method of claim 26, further comprising:

counting a number of electrical pulses produced by a position sensor; and determining a displacement distance from the fully-open or the fully-closed position of the movable gate related to subsequent movement of the movable gate.

28. A method of controlling for a gate operator, the method comprising:

increasing at least one of frequency, voltage, and pulse width of electrical power supplied to a three phase electric motor operably coupled to a moving gate according to a first continuous function dependent upon gate position until the frequency of the electrical power equals a predetermined first frequency;

monitoring positions of the movable gate; and upon the movable gate reaching a predetermined position, decreasing at least one of frequency, voltage, and pulse width of the electrical power supplied to the three phase electric motor according to a second continuous function dependent upon gate position until the frequency of the electrical power supplied to the three phase electric motor equals a predetermined second frequency.

29. A method to move a movable portion of a barrier, the movable portion having a first and second side, the movable portion having a fully closed position, the method comprising:

demarcating a first region, the first region being adjacent the first side of the movable portion of the barrier when the movable portion of the barrier is in the fully closed position;

demarcating a second region, the second region being adjacent the second side of the movable portion of the barrier when the movable portion of the barrier is in the fully closed position;

sensing with devices comprising electronic devices that a movable object is in the first region;

moving a movable portion of the barrier toward a fully open position using a barrier operator;

stopping movement of the movable portion of the barrier upon sensing that a portion of the movable object has reached the second region; and moving the movable portion of the barrier toward the fully closed position using the barrier operator upon sensing that no portions of the movable object are in the first and second regions.

30. The barrier operator of claim 1 for use with the movable barrier including a gate, wherein the drive system member is operably coupled to the gate.

31. The barrier system of claim 15 wherein the movable barrier is a gate.

32. The barrier operator of claim 22 for use with the movable barrier including a gate, wherein the motor shaft is operably coupled to the gate.

33. The barrier operator of claim 23 for use with the movable barrier including a gate, wherein the motor shaft is operably coupled to the gate.

34. The method of claim 29 wherein the moving of the movable portion of the barrier is accomplished with a gate operator.

35. The barrier operator of claim 23 wherein the electrical power has an insufficient magnitude based upon at least one of the following: voltage, current, frequency, frequency pattern, and pulse duration.

* * * * *

UNITED STATES PATENT AND TRADEMARK OFFICE
CERTIFICATE OF CORRECTION

PATENT NO. : 6,194,851 B1
DATED : February 27, 2001
INVENTOR(S) : Brian G. DeNault et al.

It is certified that error appears in the above-identified patent and that said Letters Patent is hereby corrected as shown below:

<u>Title page,</u>
Item [75], Inventors, title page, "Brian G. Denault" should read -- Brian G. DeNault --.

Item [56], References Cited, title page, reference "4,318,169" should read -- 4,319,169 --.

Signed and Sealed this

Second Day of October, 2001

Attest:

*Nicholas P. Godici*

NICHOLAS P. GODICI
*Acting Director of the United States Patent and Trademark Office*

*Attesting Officer*